US012651922B2

(12) United States Patent
Cho et al.

(10) Patent No.: US 12,651,922 B2
(45) Date of Patent: Jun. 9, 2026

(54) ELECTRONIC CONTROL SYSTEM

(71) Applicants:Inventec (Pudong) Technology Corporation, Shanghai (CN); INVENTEC CORPORATION, Taipei City (TW)

(72) Inventors: Shun-Wen Cho, Taipei City (TW); Hsun-Chen Liu, Taipei City (TW)

(73) Assignees: Inventec (Pudong) Technology Corporation, Shanghai (CN); INVENTEC CORPORATION, Taipei City (TW)

( * ) Notice: Subject to any disclaimer, the term of this patent is extended or adjusted under 35 U.S.C. 154(b) by 57 days.

(21) Appl. No.: 18/984,961

(22) Filed: Dec. 17, 2024

(65) Prior Publication Data

US 2026/0074550 A1      Mar. 12, 2026

(30) Foreign Application Priority Data

Sep. 11, 2024    (CN) .......................... 202411273150.X

(51) Int. Cl.
*G08B 21/00* (2006.01)
*B60R 16/023* (2006.01)
*B60R 16/033* (2006.01)
*H02J 9/00* (2006.01)
(52) U.S. Cl.
CPC ............ *H02J 9/005* (2013.01); *B60R 16/023* (2013.01); *B60R 16/033* (2013.01)

(58) Field of Classification Search
CPC ...... H02J 9/005; B60R 16/023; B60R 16/033; G06F 1/26; G06F 1/3203
USPC .............. 340/636.1, 644, 657, 426.36, 425.5
See application file for complete search history.

(56) References Cited

U.S. PATENT DOCUMENTS

| | | | |
|---|---|---|---|
| 8,321,707 B2 * | 11/2012 | Yang ..................... | G06F 1/3203 |
| | | | 713/340 |
| 10,343,538 B2 * | 7/2019 | Chen ....................... | B60L 58/13 |
| 12,510,950 B2 * | 12/2025 | Pedersen .............. | G06F 1/3275 |
| 2001/0016918 A1 * | 8/2001 | Alexander ............... | G06F 1/26 |
| | | | 713/323 |
| 2021/0170964 A1 * | 6/2021 | Vijithakumara ........ | B60R 16/03 |

* cited by examiner

*Primary Examiner* — Anh V La
(74) *Attorney, Agent, or Firm* — CKC & Partners Co., LLC

(57) ABSTRACT

An electronic control system includes a microcontroller and a system on chip. The microcontroller is configured to receive a controller area network wake-up signal and an ignition switch signal. The system on chip is coupled to the microcontroller. In a standby mode, the system on ship is in a first status, and the microcontroller determines whether the standby mode is switched to a boot mode or a sleep mode according to the controller area network wake-up signal and the ignition switch signal. In the boot mode, the system on chip is in a second status different from the first status to performing a system boot process, and when the system boot process is completed, the microcontroller switches the boost mode to an active mode. In the active mode, the system on chip is in a second status to control a camera to record a video.

10 Claims, 3 Drawing Sheets

300

ELECTRONIC CONTROL SYSTEM

CROSS-REFERENCE TO RELATED APPLICATION

This application claims priority to China Application Serial Number 202411273150.X, filed Sep. 11, 2024, which is herein incorporated by reference in its entirety.

BACKGROUND

Field of Invention

The present invention relates to an electronic control system. More particularly, the present invention relates to a vehicle electronic control system.

Description of Related Art

Traditionally, a mode of a vehicle system on chip is linked with an ignition switch of a vehicle. The vehicle system on chip will synchronously enters a low power mode or a power off mode when the vehicle is shut down, in order to ensure a battery level of the vehicle. In some cases, if there is an application scenario that requires to continue to operate after the vehicle is shut down, it will utilizes a supercapacitor in practice, as such the system for operating the application is able to continue to operate for a while by the supercapacitor itself after the vehicle is shut down.

For electric vehicles, since the power consumption is not the first priority, a portion of the battery energy can be used for operating functions. At this time, a core of the vehicle system on chip is required to be in an active state and control the status of peripheral input/output devices according to the application scenario.

However, the current vehicle system on chip may support low power mode, while the core of the vehicle system on chip is in an off status (such as, computation off) in the low power mode to achieve the power-saving purpose, causing that the current design is hard to satisfy the application scenario which is to continue to operate after the vehicle is shut down.

Therefore, how to provide a vehicle electronic system to solve the above problems is an important issue in this field.

SUMMARY

The present disclosure provides an electronic control system. The electronic control system includes a microcontroller and a system on chip. The microcontroller is configured to receive a controller area network wakeup signal and an ignition switch signal. The system on chip is coupled to the microcontroller. In a standby mode, the system on chip is in a first status, and the microcontroller determines whether the standby mode is switched to a boot mode or a sleep mode according to the controller area network wakeup signal and the ignition switch signal. In the boot mode, the system on chip is in a second status which is different from the first status, to perform a system boot process, and when the system boot process is completed, the microcontroller switches the boot mode to an active mode. In the active mode, the system on chip is in the second status, to control a camera to record a video.

In some embodiments, in the standby mode, if both of the controller area network wakeup signal and the ignition switch signal are inactive in a predetermined period, the microcontroller switches the standby mode to the sleep mode; and in the standby mode, if one of the controller area network wakeup signal and the ignition switch signal is active, the microcontroller wakes up the system on chip, to switch from the standby mode to the boot mode.

In some embodiments, in the active mode, the microcontroller determines the ignition switch signal is active or inactive; in the active mode, if the ignition switch signal is active, the microcontroller remains the active mode; and in the active mode, if the ignition switch signal is changed from an active state to an inactive state, the microcontroller switches the active mode to a delay off mode.

In some embodiments, in the delay off mode, the system on chip determines a delay off period according to battery level information, and the system on chip controls the camera continue to record the video, and at end of the delay off period, the system on chip controls the camera to stop recording.

In some embodiments, in the delay off mode and at the end of the delay off period, the microcontroller switches the delay off mode to a shutdown mode; and in the shutdown mode and at end of a predetermined time period, the microcontroller switches the shutdown mode to the standby mode.

In some embodiments, in the delay off mode, the system on chip turns off idle input/output devices.

In some embodiments, in the sleep mode, the microcontroller is in a sleep status and the microcontroller determined whether the sleep mode is switched to the standby mode according to the controller area network wakeup signal.

In some embodiments, when the system on chip is in a first status, a processing circuit of the system on chip is inactivated, and wherein when the system on chip is in a second status the processing circuit of the system on chip is activated.

In some embodiments, the first status is a power off status or a low power status, and wherein the second status is a power on status.

In some embodiments, an active state of the controller area network wakeup signal corresponds to a signal sent by a keyless entry system, and wherein an active state of the ignition switch signal corresponds to an on state of an ignition switch.

Summary, the electronic control system of the present disclosure turns off the system on chip in the standby mode, and whether to wakes up the system on chip is determined by the microcontroller, thereby satisfying the application scenario that is required to continue to operate after the vehicle is shut down under the condition for complying with the power consumption requirement of the vehicle system.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
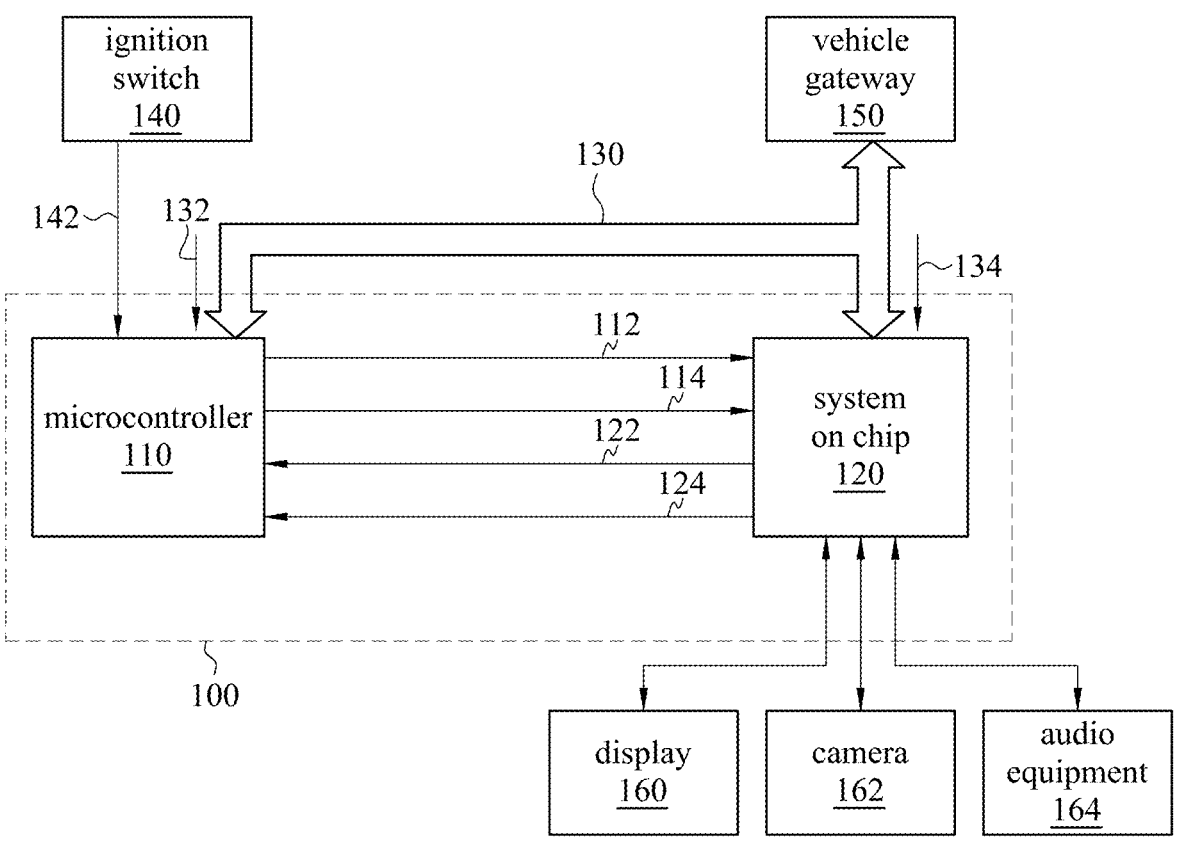
FIG. 1 depicts a schematic diagram of an electronic system in a vehicle according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

A description is provided with reference to FIG. 1. FIG. 1 depicts a schematic diagram of an electronic system in a vehicle according to some embodiments of the present disclosure. As shown in FIG. 1, the electronic system in the vehicle includes an electronic control system 100, a controller area network bus 130, an ignition switch 140, a vehicle gateway 150, a display 160, a camera 162 and audio equipment 164. In some embodiments, the electronic control system 100 has functions that are cable to control the audio and video recording device. In some embodiments, the electronic control system 100 can controls the video recording device and/or audio recording device in the vehicle to record the video inside and/or outside the vehicle. In some embodiments, electronic control system 100 corresponds to a zone controller, a domain controller or other electronic control system, it is not intended to limit the present disclosure.

In some embodiments, the electronic control system 100 includes a microcontroller (MCU) 110 and a system on chip (SoC) 120. In some embodiments, the microcontroller 110 is electrically coupled to the system on chip 120, and the microcontroller 110 communicates to the system on chip 120 by communication interfaces, the said communication interfaces include at least one of a general-purpose input/output (GPIO), a universal asynchronous receiver/transmitter (UART), an inter-integrated circuit (I2C).

In some embodiments, before the vehicle is unlocked or after the vehicle is shut down, the microcontroller 110 determines whether to wake up the system on chip 120 according to at least one of an ignition switch signal 142 from an ignition switch 140 and a controller area network wakeup signal 132 from a controller area network bus 130, thereby satisfying the application scenario that requires to continue to operate after the vehicle is shut down.

In some embodiments, the microcontroller 110 is configured to transmit the wakeup signal 112 to the system on chip 120, as such the system on chip 120 enters the power on status. In some embodiments, the system on chip 120 is configured to transmit an alive signal 122 to the microcontroller 110, in order to notify the microcontroller 110 that whether the system on chip 120 is alive.

In some embodiments, after the vehicle is shut down, the system on chip 120 determines a delay off duration period for a camera 162 according to battery level information 134 from the controller area network bus 130. In some embodiments, the system on chip 120 is configured to transmit the status signal 124 to the microcontroller 110, in order to notify the microcontroller 110 that whether the system on chip 120 is in the active status. In some embodiments, the microcontroller 110 is configured to transmit the off signal 114 to the system on chip 120, as such the system on chip 120 enters the low power status or the power off status.

Figure 2:
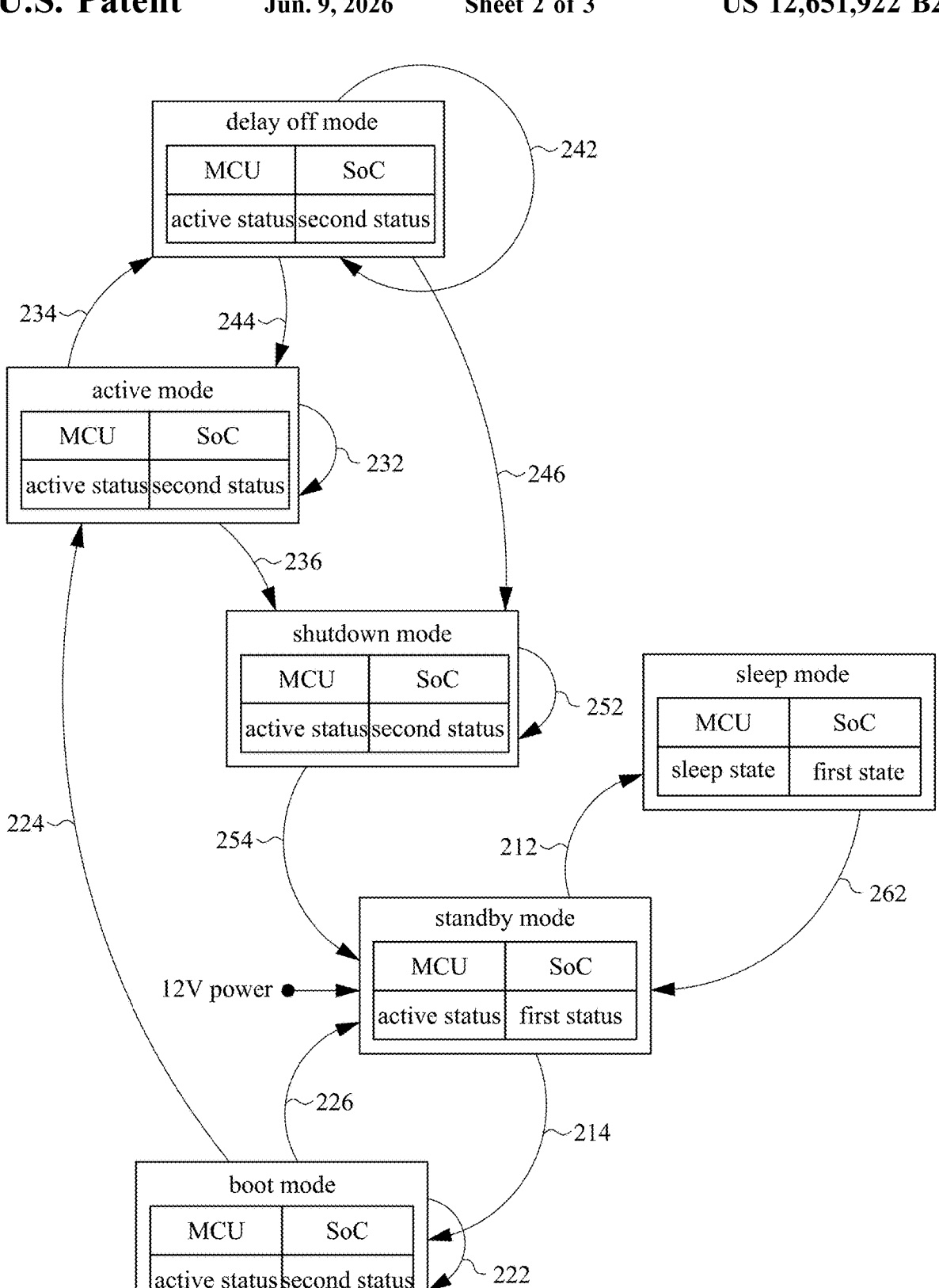
FIG. 2 depicts a schematic diagram of an operation method for an electronic control system according to some embodiments of the present disclosure.

A description is provided with reference to FIG. 1 and FIG. 2. FIG. 2 depicts a schematic diagram of an operation method for an electronic control system 100 according to some embodiments of the present disclosure. In some embodiments, the operation method of the electronic control system 100 includes steps 212, 214, 222, 224, 232, 234, 236, 242, 244, 246, 252, 254 and 262. In some embodiments, the microcontroller (MCU) in FIG. 2 corresponds to the microcontroller 110 in FIG. 1, and the system on chip (SoC) in FIG. 2 corresponds to the system on chip 120 in FIG. 1.

In some embodiments, the electronic control system 100 has six modes which are a standby mode, a boot mode, an active mode, a delay off mode, a shutdown mode and a sleep mode.

In the standby mode of the electronic control system 100, the microcontroller 110 is in an active status, and the system on chip 120 is in a first status (such as, a low power status or a power off status). When the system on chip 120 is in the low power status or the power off status, the processing circuit included in the system on chip 120 is inactive.

In step 214, when the ignition switch signal 142 or the controller area network wakeup signal 132 received by the microcontroller 110 in the standby mode changes from an inactive state (such as, a logic 0) to an active state (such as, a logic 1), the microcontroller 110 transmit a wakeup signal 112 at an active state to the system on chip 120, in order to change a mode of the electronic control system 100 from the standby mode of to the boot mode. At this time, the off signal 114 is at an inactive state. In some embodiments, an active state of the controller area network wakeup signal 132 corresponds to a signal sent by a keyless entry system, and an active state of the ignition switch signal 142 corresponds to an on state of the ignition switch 140. In some embodiments, an inactive state of the controller area network wakeup signal 132 corresponds to status when there is no signal sent by the keyless entry system, and an inactive state of the ignition switch signal 142 corresponds to an off state of the ignition switch 140. To be noted that, even if the vehicle is shut down, when the driver is at a point within a certain distance (such as, 20 meters) around the vehicle, the receiver of the vehicle is able to receive the signal sent by the keyless entry device carried by the driver, and the controller area network wakeup signal 132 is at the active state.

In step 222, the electronic control system 100 is in the boot mode, the system on chip 120 executes the system boot process. At this time, the status signal 124 of the system on chip 120 is at an inactive state. In the boot mode of the electronic control system 100, the microcontroller 110 is in the active status, and the system on chip 120 is in a second status (such as, a power on status). When the system on chip 120 is in the power on status, the processing circuit included in the system on chip 120 is active.

In the boot mode of the electronic control system 100, when the system boot process is completed, step 224 is performed. If the system boot process cannot be completed in a predetermined boot period (such as, 1800 seconds), step 226 is performed. In step 224, in the boot mode, when the processing circuit included in the system on chip 120 completes the system boot process, the status signal 124 of the system on chip 120 changes to the active state, so as to change a mode of the electronic control system 100 from the boot mode to the active mode. At this time, the wakeup signal 112 is at the active state, and the off signal 114 is at the inactive state.

In step 226, in the boot mode, the wakeup signal 112 is at the inactive state, and the off signal 114 is at the active state, in order to turn off the system on chip 120, thereby changing a mode of the electronic control system 100 from the boot mode to the standby mode. At this time, the status signal 124 of the system on chip 120 is at the inactive state.

In the active mode of the electronic control system 100, the microcontroller 110 remains or switches the mode of the electronic control system 100 according to whether the ignition switch signal 142 is active. In step 232, the electronic control system 100 is in the active mode, as such the system on chip 120 controls at least one camera (such as, the camera 162) to record a video. At this time, the wakeup signal 112 is at the active state, and the ignition switch signal 142 is at the active state.

In step 234, in the active mode, when the ignition switch signal 142 changes from the active state to the inactive state, the microcontroller 110 changes a mode of the electronic control system 100 from the active mode to the delay off mode. At this time, the alive signal 122 of the system on chip 120 is at the active state.

In step 236, in the active mode, when the status signal 124 of the system on chip 120 changes to the inactive state, the microcontroller 110 changes a mode of the electronic control system 100 from the active mode to the shutdown mode. At this time, the wakeup signal 112 is at the active state, and the off signal 114 is at the active state.

In the delay off mode of the electronic control system 100, the system on chip 120 determines a delay off period of the camera (such as, the camera 162), and the system on chip 120 controls the camera 162 continue to record the video during the said delay off period. In some embodiments, the system on chip 120 can determine the delay off period according to the battery level of the vehicle (such as, an electric vehicle). For example, if the battery level is higher than 80%, the delay off period is set at 60 minutes; if the battery level is in a range of 20%~80%, the delay off period is set at 30 minutes; and if the battery level is less than 20%, the delay off period is set at 5 minutes.

In step 242, in the delay off mode, a point in time that the system on chip 120 changes the active state of the ignition switch signal 142 to the inactive state is considered as a start point in time to start timing, and the delay off period for the video recording application program is determined according to the battery level information 134. At this time, the wakeup signal 112 is at the active state, and the alive signal 122 of the system on chip 120 is at the active state.

In step 244, in the delay off mode, when the alive signal 122 of the system on chip 120 changes from the active state to the inactive state, the mode of the electronic control system 100 changes from the delay off mode to the active mode, thereby entering the shutdown mode according to the status signal 124 at the inactive state.

In step 246, at the end of the aforesaid delay off period, the system on chip 120 controls the camera 162 to stop recording, and the microcontroller 110 switches the mode of the electronic control system 100 from the delay off mode to the shutdown mode.

In step 242, in the shutdown mode, the system on chip 120 computes a predetermined time (such as, 120 seconds).

In step 254, in the shutdown mode, when the said predetermined time (such as, 120 seconds) expires, the mode of the electronic control system 100 changes from the shutdown mode to the standby mode. At this time, the active state of the wakeup signal 112 changes to the inactive state, and the off signal 114 is at the active state, so as to changes the status of the system on chip 120 from the power on status to the power off status or the low power status, thereby reducing the power consumption.

In step 212, in the standby mode, the ignition switch signal 142 and the controller area network wakeup signal 132 are at the inactive state, and when an idle time of the electronic control system 100 exceeds 60 seconds, the mode of the electronic control system 100 changes from the standby mode to the sleep mode. At this time, both of the wakeup signal 112 and the off signal 114 are at the inactive state.

In step 262, in the sleep mode, at least one of the ignition switch signal 142 and the controller area network wakeup signal 132 is at the active state to trigger the microcontroller 110, the microcontroller 110 changes from the sleep status to the active status, and switches the mode of the electronic control system 100 from the sleep mode to the standby mode. At this time, both of the wakeup signal 112 and the off signal 114 are at the inactive state.

Figure 3:
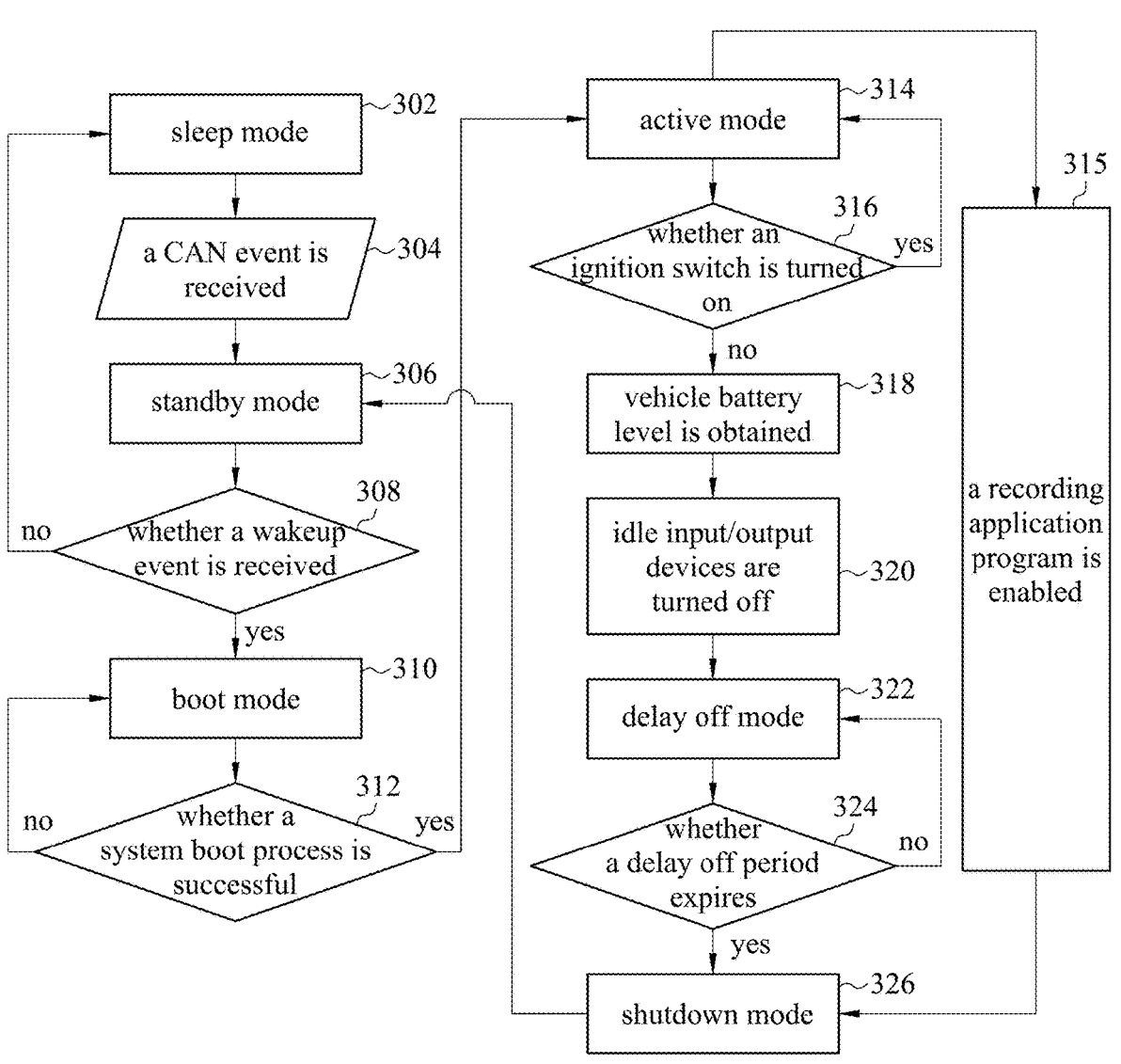
FIG. 3 depicts a flow chart of an operation method for an electronic control system according to some embodiments of the present disclosure.

A description is provided with reference to FIG. 1 and FIG. 3. FIG. 3 depicts a flow chart of an operation method 300 for an electronic control system 100 according to some embodiments of the present disclosure. As shown in FIG. 3. the operation method 300 includes steps 302, 304, 308, 310, 312, 314, 315, 316, 318, 320,322, 324, and 326.

In step 302, the electronic control system 100 in the sleep mode. In the sleep mode, the microcontroller 110 is in the sleep status, and the system on chip 120 is in the first status (such as, the power off status or the low power status).

In step 304, the controller area network event received. For example, when the driver enters a range within a distance (such as, 20 meters) around the vehicle, the receiver of the vehicle can receive a signal sent by the keyless entry device carrier by the driver, then the controller area network wakeup signal 132 is at the active state, thereby triggering the microcontroller 110 to switches the mode of the electronic control system 100 from the sleep mode to the standby mode.

In step 306, the electronic control system 100 is in the standby mode. In the standby mode, the microcontroller 110 is in the active status, and the system on chip 120 is in the first status (such as, the power off status or the low power status).

In step 308, whether a wakeup event is received is determined. In some embodiments, the wakeup event can be an event that the ignition switch 140 is turned on or an event for receiving the signal sent by the keyless entry device. If YES, step 310 is performed. Otherwise, step 302 is executed.

For example, in the standby mode, if the driver is at a point with a certain distance (such as, 20 meters) around the vehicle, as such the controller area network wakeup signal 132 is at the active state, it triggers the microcontroller 110 to switches the mode of the electronic control system 100 from the standby mode to the boot mode.

For another example, in the standby mode, of the driver starts the vehicle and the ignition switch signal 142 is at the active state, it triggers the microcontroller 110 to switches the mode of the electronic control system 100 from the standby mode to the boot mode.

In some embodiments, if the driver is outside a certain distance (such as, 20 meters) around the vehicle or the vehicle is shut down, the microcontroller 110 receives no wakeup event.

In step 310, the electronic control system 100 is in the boot mode. In the boot mode, the microcontroller 110 is in the active status, and the system on chip 120 is in the second status (such as, the power on status) to execute the system boot process.

In step 312, whether the system boot process is successful is determined. In some embodiments, when the system boot process of the system on chip 120 is completed, step 314 is performed. Otherwise, return to step 310.

In step 314, the electronic control system 100 is in the active mode. In the active mode, the microcontroller 110 is in the active status, and the system on chip 120 is in the second status (such as, the power on status) to execute step 315, turning on and controlling the video recording application program/device (such as, the camera 162 and/or the audio equipment 164) to record the video.

In step 316, in the active mode, the microcontroller 110 determines whether the ignition switch 140 is turned on. If YES, return to step 314. Otherwise, if the ignition switch 140 is turned off, step 318 is executed.

In step 318, the vehicle battery level is obtained. The system on chip 120 obtains the vehicle battery level from the controller area network bus 130, in order to determine the delay off time for the video recording application program/device according to the vehicle battery level.

In step 320, the system on chip 120 turns off idle input/output device except the recording devices (such as, the camera 162a and/or the audio equipment 164).

In step 322, the electronic control system 100 is in the delay off mode. In the delay off mode, the microcontroller 110 is in the active status, and the system on chip 120 is in the second status (such as, the power on status) to execute step 324, delaying the duration period for the video recording application program/device to record the video.

In step 324, whether the delay off period expires is determined. At the end of the delay off period, step 324 is executed. Otherwise, return to step 322.

In step 326, the electronic control system 100 is in the shutdown mode to shut down the recording of the video and turn off the video recording application program/device. Continue to execute step 306.

Summary, the electronic control system 100 of the present disclosure turns off the system on chip 120 in the standby mode, and whether to wakes up the system on chip 120 is determined by the microcontroller 110, thereby satisfying the application scenario that is required to continue to operate after the vehicle is shut down under the condition for complying with the power consumption requirement of the vehicle system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic control system, comprising:
a microcontroller, configured to receive a controller area network wakeup signal and an ignition switch signal; and
a system on chip, coupled to the microcontroller, wherein:
in a standby mode, the system on chip is in a first status, and the microcontroller determines whether the standby mode is switched to a boot mode or a sleep mode according to the controller area network wakeup signal and the ignition switch signal;
in the boot mode, the system on chip is in a second status which is different from the first status, to perform a system boot process, and when the system boot process is completed, the microcontroller switches the boot mode to an active mode; and
in the active mode, the system on chip is in the second status, to control a camera to record a video.

2. The electronic control system of claim 1, wherein:
in the standby mode, if both of the controller area network wakeup signal and the ignition switch signal are inactive in a predetermined period, the microcontroller switches the standby mode to the sleep mode; and
in the standby mode, if one of the controller area network wakeup signal and the ignition switch signal is active, the microcontroller wakes up the system on chip, to switch from the standby mode to the boot mode.

3. The electronic control system of claim 1, wherein:
in the active mode, the microcontroller determines the ignition switch signal is active or inactive;
in the active mode, if the ignition switch signal is active, the microcontroller remains the active mode; and
in the active mode, if the ignition switch signal is changed from an active state to an inactive state, the microcontroller switches the active mode to a delay off mode.

4. The electronic control system of claim 3, wherein:
in the delay off mode, the system on chip determines a delay off period according to battery level information, and the system on chip controls the camera continue to record the video,
and wherein at end of the delay off period, the system on chip controls the camera to stop recording.

5. The electronic control system of claim 4, wherein:
in the delay off mode and at the end of the delay off period, the microcontroller switches the delay off mode to a shutdown mode; and
in the shutdown mode and at end of a predetermined time period, the microcontroller switches the shutdown mode to the standby mode.

6. The electronic control system of claim 4, wherein:
in the delay off mode, the system on chip turns off idle input/output devices.

7. The electronic control system of claim 1, wherein:
in the sleep mode, the microcontroller is in a sleep status and the microcontroller determined whether the sleep mode is switched to the standby mode according to the controller area network wakeup signal.

8. The electronic control system of claim 1, wherein when the system on chip is in the first status, a processing circuit of the system on chip is inactivated, and wherein when the system on chip is in the second status the processing circuit of the system on chip is activated.

9. The electronic control system of claim 1, wherein the first status is a power off status or a low power status, and wherein the second status is a power on status.

10. The electronic control system of claim 1, wherein an active state of the controller area network wakeup signal corresponds to a signal sent by a keyless entry system, and wherein an active state of the ignition switch signal corresponds to an on state of an ignition switch.

* * * * *